(12) United States Patent
Jiao et al.

(10) Patent No.: US 11,456,656 B2
(45) Date of Patent: Sep. 27, 2022

(54) DC-SIDE SOFT SWITCHING DEVICE FOR CONVERTER AND SWITCHING METHOD USING THE SAME

(71) Applicant: Delta Electronics (Shanghai) Co., Ltd., Shanghai (CN)

(72) Inventors: Bing Jiao, Shanghai (CN); Jun Liu, Shanghai (CN); Hongyang Wu, Shanghai (CN); Wei Guan, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/386,537

(22) Filed: Jul. 28, 2021

(65) Prior Publication Data
US 2022/0037983 A1    Feb. 3, 2022

(30) Foreign Application Priority Data

Jul. 31, 2020    (CN) .......................... 202010755128.4

(51) Int. Cl.
    *H02M 1/08*    (2006.01)
    *H02M 1/00*    (2006.01)
(52) U.S. Cl.
    CPC ........... *H02M 1/0058* (2021.05); *H02M 1/08* (2013.01)

(58) Field of Classification Search
    CPC ....... H02M 1/0058; H02M 1/08; H02M 1/088
    USPC ................................ 327/403, 419, 530, 574
    See application file for complete search history.

(56) References Cited

U.S. PATENT DOCUMENTS

2021/0391782 A1* 12/2021 Shi ...................... H02M 7/4818

FOREIGN PATENT DOCUMENTS

| CN | 104228588 B | 1/2017 |
| CN | 105137336 B | 7/2018 |

* cited by examiner

*Primary Examiner* — William Hernandez
(74) *Attorney, Agent, or Firm* — CKC & Partners Co., LLC

(57) ABSTRACT

A DC-side soft switching device for a converter includes a battery, a bus capacitor, a first relay switch, a first resistor, a second relay switch, a second resistor, and a third resistor. The first relay switch is arranged between an anode of the battery and the bus capacitor. The first resistor is electrically connected in parallel to the first relay switch. The second relay switch is arranged between a cathode of the battery and the bus capacitor. The second resistor is electrically connected in parallel to the second relay switch. The third resistor is electrically connected in parallel to the bus capacitor.

14 Claims, 3 Drawing Sheets

DC-SIDE SOFT SWITCHING DEVICE FOR CONVERTER AND SWITCHING METHOD USING THE SAME

CROSS-REFERENCE TO RELATED APPLICATIONS

This non-provisional application claims priority under 35 U.S.C. § 119(a) on Patent Application No. 202010755128.4 filed in P.R. China on Jul. 31, 2020, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

BACKGROUND OF THE INVENTION

1. Field of the Invention

The invention relates to converters, and particularly to a DC-side soft switching device for a converter and a method for powering on and off using the DC-side soft switching device.

2. Related Art

The energy storage converter system consists of a bidirectional energy storage converter and an energy storage medium (e.g., a power battery) together, and its application enables a microgrid more intelligent and stable. The energy storage converter system serves as a core component of the future microgrid, and users can be greatly benefited.

FIG. 1 illustrates a structure of a conventional energy storage converter system, and FIG. 2 is a simplified structural diagram of FIG. 1. Generally, a DC relay switch is provided between a battery and a DC side of the converter, and the DC relay switch must be selected to be at a level corresponding to a battery voltage. For example, when the battery voltage is 1500V, the DC relay switch must be selected to be at the level of 1500V. However, the high-voltage DC relay switch has a high cost, a large volume, and a single model, such that it is rather difficult for the energy storage converter system to develop towards miniaturization and low costs.

Therefore, there is a need to seek a DC-side soft switching device for a converter with low costs and a small volume and a method for powering on and off using the DC-side soft switching device.

SUMMARY OF THE INVENTION

In view of this, an object of the invention is to provide a DC-side soft switching device for a converter, which reduces the voltage across the relay switch by connecting a divider resistor in parallel to the relay switch and connecting a discharge resistor in parallel to the bus capacitor while cooperating with ON/OFF timing control, such that the relay switches at low voltage level may be selected to realize miniaturization and low costs of the products.

To realize the above object, according to one aspect of the invention, it provides a DC-side soft switching device for a converter, comprising:
   a battery having an anode and a cathode;
   a bus capacitor;
   a first relay switch arranged between the anode of the battery and the bus capacitor;
   a first resistor electrically connected in parallel to the first relay switch;
   a second relay switch arranged between the cathode of the battery and the bus capacitor;
   a second resistor electrically connected in parallel to the second relay switch; and
   a third resistor electrically connected in parallel to the bus capacitor.

According to another aspect of the invention, it further provides a method for powering on and off using the DC-side soft switching device, comprising:
   turning on the second relay switch;
   turning on the pre-charging relay switch to charge the bus capacitor to a first predetermined voltage;
   turning on the first relay switch; and
   turning off the pre-charging relay switch and powering on.

By connecting a divider resistor in parallel to the relay switch and connecting a discharge resistor in parallel to the bus capacitor while cooperating with timing control, the invention reduces the voltage across the relay switch, such that the relay switches at low voltage levels can be selected to realize miniaturization and low costs of the products.

Hereinafter the disclosures are described in detail with reference to the embodiments, and further explanations are provided to the technical solution of the invention.

BRIEF DESCRIPTION OF THE DRAWINGS

To make the above and other objects, features, advantages, and examples of the invention more apparent, the accompanying drawings are explained as follows.

DETAILED EMBODIMENTS OF THE INVENTION

Figure 1:
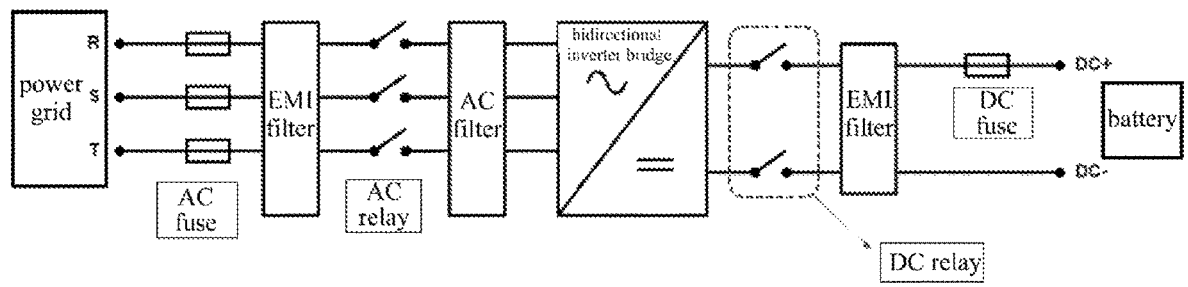
FIG. 1 is a structural diagram of a conventional energy storage converter system.
Figure 2:
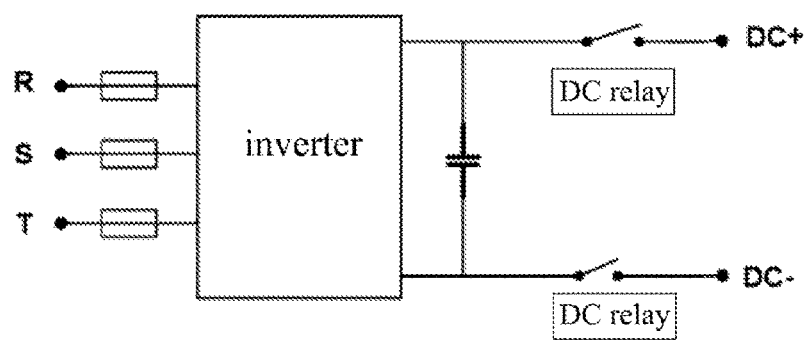
FIG. 2 illustrates a simplified structural diagram of the energy storage converter system of FIG. 1.

To make the invention more detailed and complete, references can be made to the accompanying drawings and the various embodiments, and the same sign in the drawings represents the same or similar component. On the other hand, the known components and steps are not described in the embodiments to avoid unnecessary limitations to the invention. Besides, to simplify the drawings, some known customary structures and elements are illustrated in a way of simple illustrations in the drawings.

Figure 3:
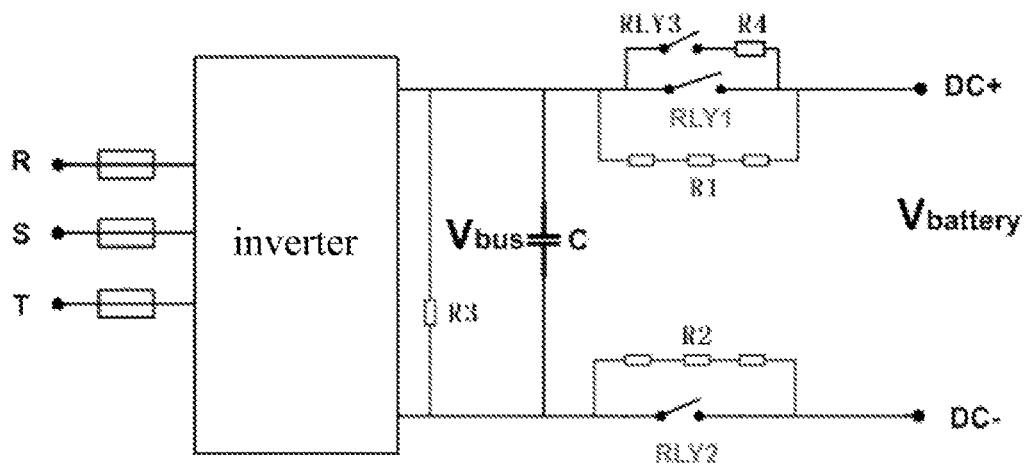
FIG. 3 illustrates a structural diagram of a DC-side soft switching device for a converter according to an embodiment of the invention.
Figure 4:
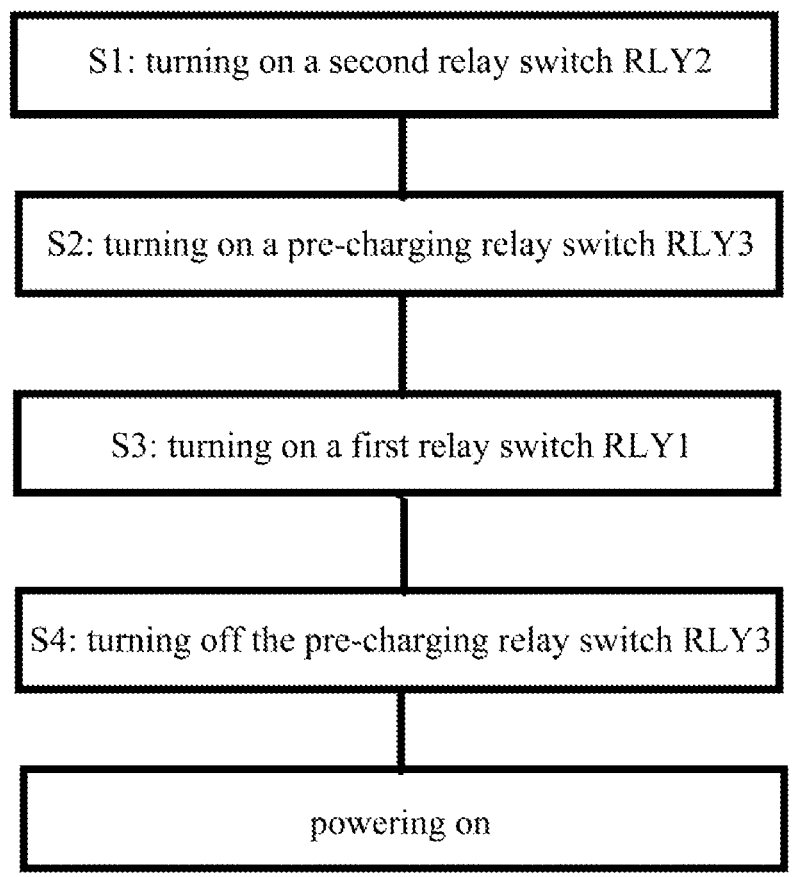
FIG. 4 illustrates a flow chart of a method for powering on using the DC-side soft switching device according to an embodiment of the invention.

FIG. 3 illustrates a structural diagram of a DC-side soft switching device for a converter according to an embodiment of the invention. In this embodiment, the DC-side soft switching device includes a battery (not shown), a bus capacitor C, a first relay switch RLY1, a first resistor R1, a second relay switch RLY2, a second resistor R2, and a third resistor R3. Further, the battery has an anode and a cathode. The anode of the battery is connected to DC+, and the cathode of the battery is connected to DC−. The first relay switch RLY1 is arranged between the anode (i.e., DC+) of the battery and a positive terminal of the bus capacitor C. The first resistor R1 is electrically connected in parallel to the first relay switch RLY1. The second relay switch RLY2 is arranged between a cathode (i.e., DC−) of the battery and a negative terminal of the bus capacitor C. The second resistor R2 is electrically connected in parallel to the second relay switch RLY2. The third resistor R3 is electrically connected in parallel to the bus capacitor C.

Illustratively, for example, the first resistor R1 is connected directly in parallel to the first relay switch RLY1. Similarly, the second resistor R2 is connected directly in parallel to the second relay switch RLY2. The third resistor R3 is connected directly in parallel to the bus capacitor C.

From the above, the battery of the invention may be a high voltage battery, such as a battery with a voltage of 1500V or higher; while the first relay switch RLY1 and the second relay switch RLY2 may be relay switches with a lower rated voltage relative to the battery voltage ($V_{battery}$), such as the ones with a rated voltage less than the battery voltage and greater than or equal to a half of the battery voltage. For example, when the battery voltage is 1500V, relay switches at 750V or 1000V may be selected, thereby realizing miniaturization and low costs. It shall be noted that the DC-side soft switching device of the disclosure may be applied to various converters. FIG. 3 takes an inverter for example, and in some other embodiments, it may also be DC/DC converters and the like.

According to another embodiment of the invention, the first resistor R1 comprises a plurality of resistors connected in series. As shown in FIG. 3, the first resistor R1 comprises three resistors connected in series, but the number of resistors is not limited thereto. In some embodiments, the first resistor R1 is a high voltage resistor, and with increasing voltage level, the number of series resistors may be adjusted adaptively.

According to another embodiment of the invention, the second resistor R2 also comprises a plurality of resistors connected in series. As shown in FIG. 3, the second resistor R2 comprises three resistors connected in series, but the number of resistors is not limited thereto. Similarly, in some embodiments, the second resistor R2 is a high voltage resistor, and with increasing of voltage level, the number of series resistors may be adjusted adaptively.

As shown in FIG. 3, the third resistor R3 is a single resistor, but in some other embodiments of the invention, the third resistor R3 may comprise a plurality of resistors connected in series. The number of the third resistors R3 is not limited thereto.

According to another embodiment of the invention, the DC-side soft switching device further comprises a pre-charging unit. The pre-charging unit is electrically connected in parallel to the first relay switch RLY1. Further, the pre-charging unit comprises a pre-charging relay switch RLY3 and a fourth resistor R4 connected in series. The fourth resistor R4 may be one resistor or a plurality of resistors connected in series, but the number of the fourth resistor is not limited thereto.

According to another embodiment of the invention, in a state where both the first relay switch RLY1 and the second relay switch RLY2 are turned off, the first resistor R1 and the second resistor R2 divide a voltage difference ($V_{battery}$−$V_{bus}$) between the battery and the bus capacitor. Either the voltage across the first resistor R1 or the voltage across the second resistor R2 is smaller than the battery voltage. Exemplarily, when respective resistance values of the first resistor R1 and the second resistor R2 are the same, the voltage across the first resistor R1 and the voltage across the second resistor R2 are the same. Correspondingly, the voltage withstood by the first relay switch RLY1 and the voltage withstood by the second relay switch RLY2 are smaller than the battery voltage. Exemplarily, the voltage withstood by the first relay switch RLY1 is equal to the voltage withstood by the second relay switch RLY2.

According to another embodiment of the invention, in the state where the first relay switch RLY1 and the second relay switch RLY2 are turned off, if a voltage across the bus capacitor C is zero, when the resistance value of the first resistor R1 is greater than or equal to the resistance value of the second resistor R2, according to voltage dividing principle, the voltage across the first resistor R1 is greater than or equal to half of the battery voltage. Correspondingly, the voltage across the second resistor R2 is less than or equal to half of the battery voltage, and vice versa. It can be understood that the voltage withstood by the first relay switch RLY1 and the voltage withstood by the second relay switch RLY2 are smaller than the battery voltage.

Taking a battery voltage at 1500V for example, when the voltage across the bus capacitor C is zero, and the respective resistance values of the first resistor R1 and the second resistor R2 are the same, the voltage across the first resistor R1 and the voltage across the second resistor R2 are both 750V. That is, the voltage across the first relay switch RLY1 and the voltage across the second relay switch RLY2 are both 750V.

According to another embodiment of the invention, the DC-side soft switching device further comprises a voltage detecting unit (not shown). The voltage detecting unit is used to detect a voltage across the second relay switch RLY2, which is in a non-conducting state.

According to another embodiment of the invention, the DC-side soft switching device may comprise a plurality of voltage detecting units for detecting the battery voltage, the voltage across the bus capacitor C, and the voltage across the second relay switch RLY2, respectively. Also, the soft switching device may further calculate the voltage across the first relay switch RLY1 on basis of the detected voltages by the plurality of voltage detecting units, thereby judging whether the second relay switch RLY2 and the first relay switch RLY1 occur failure before powering on.

According to another embodiment of the invention, taking the rated voltages of both the first relay switch RLY1 and the second relay switch RLY2 being half of the battery voltage, for example, the disclosure further provides a method for powering on and off using the DC-side soft switching device. In detail, the method can be realized by performing the following steps. Firstly, in step S1, the second relay switch RLY2 is turned on. Then, in step S2, the pre-charging relay switch RLY3 is turned on and thereby charges the bus capacitor C to a first predetermined voltage. Then, in step S3, the first relay switch RLY1 is turned on. Finally, in step S4, the pre-charging relay switch RLY3 is turned off and powering on.

In some embodiments, the first predetermined voltage is greater than or equal to half of the battery voltage, and thus the voltage across the first relay switch RLY1 is not more than the rated voltage (i.e., half of the battery voltage) when the first relay switch RLY1 is turned on.

According to another embodiment of the invention, before turning on the second relay switch RLY2, the voltage across the second relay switch RLY2 is detected; and when the voltage across the second relay switch RLY2 is less than the rated voltage of the second relay switch RLY2, the second relay switch RLY2 is turned on. It shall be noticed that in this embodiment, the voltage across the second relay switch RLY2 may be detected in various manners. It may be detected directly by using a detecting unit or be obtained by calculation. For example, the battery voltage, the voltage of the bus capacitor, and the voltage across the first relay switch RLY1 are detected by the detecting unit, and the voltage across the second relay switch RLY2 is calculated on basis of these detected voltages.

In this embodiment, before turning on the first relay switch RLY1, in order to ensure the voltage across the closed first relay switch to be no more than the rated voltage, the voltage across the first relay switch RLY1 may be detected, and the first relay switch RLY1 is turned on when the voltage across the first relay switch RLY1 is less than the rated voltage.

In some embodiments, the method further the steps of locking a driving signal of the converter and turning off the first relay switch RLY1 and the second relay switch RLY2, and maintaining a voltage across the bus capacitor C within a predetermined range during the period of the first relay switch RLY1 and the second relay switch RLY2 in a non-conducting state.

In some embodiments, the predetermined range of the bus capacitor C is greater than or equal to half of the battery voltage. For example, the rated voltages of the first relay switch RLY1 and/or the second relay switch RLY2 are half of the battery voltage. Further, an operating voltage when the first relay switch RLY1 and/or the second relay switch RLY2 is turned off can be ensured to be less than the rated voltage. It can be understood that the predetermined range depends on the rated voltage of the first relay switch RLY1 and/or the second relay switch RLY2. It shall be ensured that the operating voltage cannot exceed its rated voltage when the relay switch is turned off.

Based on the above, making use of characteristics of a short turn-off time of the relay switch, a long discharge time of the bus capacitor, and no jump of the voltage across the bus capacitor, the disclosure controls the bus capacitor to discharge forcibly through software after the turn-off process of the relay switch is completed.

In some embodiments, the turn-off timing of the first relay switch RLY1 and the second relay switch RLY2 is optional. They may be turned off either simultaneously or sequentially.

According to another embodiment of the invention, after the first relay switch RLY1 and the second relay switch RLY2 are turned off, the bus capacitor is discharged by the third resistor R3 or a forced discharging circuit.

According to another embodiment of the invention, during the turn-off period of the first relay switch RLY1 and the second relay switch RLY2, the bus capacitor is discharged by the third resistor R3 and the voltage across the bus capacitor is maintained within the predetermined range.

It can be understood that the turn-off period of the first relay switch RLY1 and the second relay switch RLY2 may last for several or tens of milliseconds. For example, the period may refer to a time interval from the two relay switches starting to turn off simultaneously till the two relay switches being turned off completely. However, there may be a case where the two relay switches are asynchronous, and the "period" refers to a time interval from the turn-off time point of the first relay switch to the complete turn-off time point of the two relay switches.

In this embodiment, the rated voltage of the relay switch is selected to be greater than half of the battery voltage and less than the battery voltage. For example, when the battery voltage is 1500V, the rated voltage of the first relay switch RLY1 and the second relay switch RLY2 is selected to be 1000V, such that the stability of the system can be further improved.

By connecting a divider resistor in parallel to the relay switch and connecting a discharge resistor in parallel to the bus capacitor while cooperating with timing control, the disclosure reduces the voltages across the relay switches, such that the relay switches can be selected to those relay switches at lower voltage levels to realize miniaturization and low costs.

Although the invention has been disclosed by the embodiments, the invention is not limited thereto. Any skilled in the art shall make various changes and modifications without departing from the spirit and scope of the invention, so the scope protected by the invention shall be subjected to the scope defined by the appended claims.

What is claimed is:

1. A DC-side soft switching device for a converter, comprising:
    a battery having an anode and a cathode;
    a bus capacitor;
    a first relay switch arranged between the anode of the battery and the bus capacitor;
    a first resistor electrically connected in parallel to the first relay switch;
    a second relay switch arranged between the cathode of the battery and the bus capacitor;
    a second resistor electrically connected in parallel to the second relay switch; and
    a third resistor electrically connected in parallel to the bus capacitor.

2. The DC-side soft switching device according to claim 1, wherein the first resistor comprises a plurality of resistors connected in series.

3. The DC-side soft switching device according to claim 2, wherein the second resistor comprises a plurality of resistors connected in series.

4. The DC-side soft switching device according to claim 1, wherein the third resistor comprises a plurality of resistors connected in series.

5. The DC-side soft switching device according to claim 1, further comprising a pre-charging unit, wherein the pre-charging unit is connected in parallel to the first relay switch and comprises a pre-charging relay switch and a fourth resistor connected in series.

6. The DC-side soft switching device according to claim 1, wherein during the turn-off period of the first relay switch and the second relay switch, the voltage across the first resistor and the voltage across the second resistor are less than a battery voltage.

7. The DC-side soft switching device according to claim 6, wherein during the turn-off period of the first relay switch and the second relay switch, the voltage across the first resistor or the voltage across the second resistor is greater than or equal to a half of the battery voltage.

8. The DC-side soft switching device according to claim 7, wherein the battery voltage is 1500V, and the voltage across the first resistor and the voltage across the second resistor are 750V.

9. The DC-side soft switching device according to claim 1, further comprising a voltage detecting unit for detecting a voltage across the second relay switch in a turn-off state.

10. A method for powering on and off using the DC-side soft switching device according to claim 1, comprising:
 turning on the second relay switch;
 turning on a pre-charging relay switch to charge the bus capacitor to a first predetermined voltage, wherein the pre-charging relay switch is electrically connected to the first relay switch;
 turning on the first relay switch; and
 turning off the pre-charging relay switch and powering on the converter.

11. The method according to claim 10, wherein before turning on the second relay switch, the method further comprising the steps of:
 detecting a voltage across the second relay switch;
 determining whether or not the voltage across the second relay switch is less than a rated voltage of the second relay switch; and
 turning on the second relay switch when the voltage across the second relay switch is less than a rated voltage of the second relay switch.

12. The method according to claim 10, further comprising:
 locking a driving signal of the converter; and
 turning off the first relay switch and the second relay switch, and maintaining a voltage across the bus capacitor within a predetermined range during the turn-off period of the first relay switch and the second relay switch.

13. The method according to claim 12, wherein after turning off the first relay switch and the second relay switch, the method further comprising the step of:
 discharging the bus capacitor by the third resistor or a forced discharging circuit.

14. The method according to claim 12, wherein during the turn-off period of the first relay switch and the second relay switch, the bus capacitor is discharged by the third resistor, and the voltage across the bus capacitor is maintained within the predetermined range.

\* \* \* \* \*